United States Patent

[11] 3,599,547

[72] Inventor Karl Wagner
 Ottobrunn, Germany
[21] Appl. No. 828,147
[22] Filed May 27, 1969
[45] Patented Aug. 17, 1971
[73] Assignee Agfa-Gevaert Aktiengesellschaft
 Leverkusen, Germany
[32] Priority June 1, 1968
[33] Germany
[31] P 17 72 558.5

[54] PHOTOGRAPHIC APPARATUS WITH AUTOMATIC EXPOSURE CONTROL MEANS
11 Claims, 4 Drawing Figs.

[52] U.S. Cl. ................................................ 95/10 C,
 95/64 D
[51] Int. Cl. ...................................................... G03b 7/14
[50] Field of Search ........................................... 95/10 C

[56] References Cited
UNITED STATES PATENTS
3,433,140 3/1969 Wick et al. .................. 95/10 C 3,500,731 3/1970 Bresson et al. ................ 95/10 C Primary Examiner—Samuel S. Matthews
Assistant Examiner—R. E. Adams
Attorney—Michael S. Striker ABSTRACT: A photographic apparatus wherein the needle of the light meter is movable between first and second ranges of positions which respectively indicate higher and lower scene brightnesses. A detector which is movable into engagement with the needles in response to actuation of the camera release selects the size of the diaphragm aperture as a function of a higher scene brightness and selects a constant medium aperture size when the brightness of the scene is low. The exposure time is selected as a function of scene brightness; however, the rate at which the exposure time changes when the needle moves within the first range of positions is different from the rate at which the exposure time changes when the needle moves within the second range of positions, i.e., when the aperture size remains constant.

PATENTED AUG 17 1971

INVENTOR.
KARL WAGNER
BY

PHOTOGRAPHIC APPARATUS WITH AUTOMATIC EXPOSURE CONTROL MEANS

BACKGROUND OF THE INVENTION

The present invention relates to photographic apparatus in general, and more particularly to improvements in exposure controls for photographic apparatus. Still more particularly, the invention relates to improvements in exposure controls which are designed to select the aperture size and/or the exposure time as a function of scene brightness.

SUMMARY OF THE INVENTION

An object of the invention is to provide an exposure control for use in still cameras or motion picture cameras which enables the camera to make automatic exposures when the intensity of scene light is normal as well as when the intensity of scene light is below average.

Another object of the invention is to provide an exposure control which can automatically set an optimum aperture size in the range of low scene brightnesses to insure that the camera will make exposures with satisfactory depth of field.

A further object of the invention is to provide an automatic exposure control which can set the exposure time as a function of scene brightness not only when the brightness is within the expected range but also when the brightness is below average.

The invention is embodied in a photographic apparatus which comprises light meter means having an output member movable between first and second ranges of positions which are respectively indicative of higher (average) and lower (below average) scene brightnesses, detector means operatively connected with the diaphragm and movable into engagement with the output member (preferably in response to actuation of the camera release) to thereby select one of a series of aperture sizes when the output member assumes one of the first range of positions and to select a predetermined (preferably medium) aperture size when the output member assumes one of the second range of positions, adjustable exposure-time-setting means operative to select the exposure time as a function of scene brightness, and control means (preferably comprising an R-C link which includes the light meter means) for adjusting the exposure time setting means as a function of the predetermined aperture size when the output member assumes one of the second range of positions. Thus, the rate at which the exposure time changes in response to a change of average scene brightness is different from the rate at which the exposure time changes in response to a change in below-average scene brightness, namely, when the diaphragm is set to furnish an aperture of predetermined size which does not change in response to a change in below-average scene brightness.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
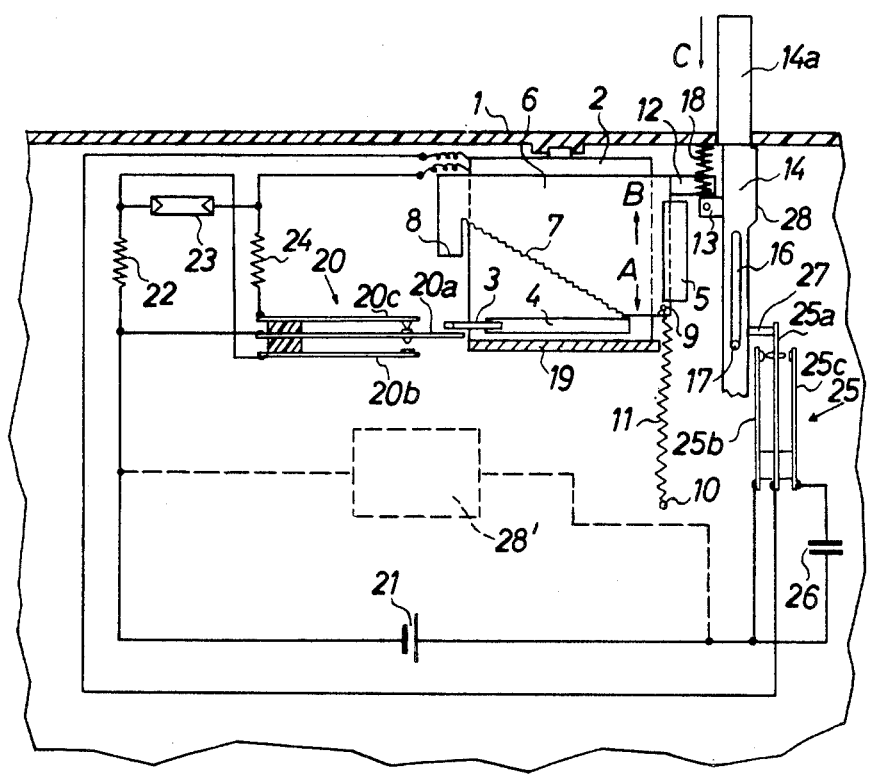
FIG. 1 is a fragmentary sectional view of a still camera which embodies one form of the invention and wherein the exposure-time-setting means is actuated by the camera release.

Referring to FIG. 1, there is shown a portion of a still camera which comprises a housing or body 1 accommodating a light meter 2 which forms part of the improved exposure control. The output member or needle 3 of the light meter 2 is movable between a plurality of positions each of which is indicative of a different scene brightness. The outer part of the needle 3 extends through a slot 4 of the light meter casing and is movable along a fixed back support 19 and along a movable contact 20a forming part of a two-way disconnecting switch 20. The position of the needle 3 can be tracked by the stepped scanning surface 7 or by the flat scanning surface 8 of a setting member or detector 6 which is reciprocable in guide means 5 in directions indicated by arrows A and B. The guide means 5 is fixed to the housing 1. The stepped scanning surface 7 can engage the needle 3 when the latter is adjacent to the back support 19; this takes place when the position of the needle 3 is indicative of one of a range of normal or average scene brightnesses. The needle 3 registers with and can be engaged by the scanning surface 8 when the light meter 2 detects a less-than-average scene brightness.

The detector 6 is biased toward engagement with the needle 3 by a helical spring 11 which is connected to a first post 9 on the detector and to a second post 10 in the housing 1. This spring normally maintains a projection or arm 12 of the detector 6 in abutment with a stop 13 provided on a camera release member or slide 14 which is reciprocably installed in the housing 1 and has a manually depressible portion or knob 14a extending upwardly beyond the top wall of the housing. The means for guiding the camera release 14 during movement with reference to the housing 1 comprises a cutout in the top wall of the housing, a fixed pin 17 in the housing, and an elongated slot 16 provided in the camera release and receiving the pin 17. A relatively strong return spring 18 normally maintains the camera release 14 in the illustrated starting position in which the pin 17 extends into the lower end portion of the slot 16. The aforementioned back support 19 is fixedly mounted in the housing 1. The two-way switch 20 comprises two additional contacts 20b, 20c which flank the movable contact 20a. The latter is connected with one pole of an energy source 21 (e.g. a battery) and with one end of a first corrective resistor 22. This resistor 22 is in series with a photosensitive receiver 23 (e.g., a photoconductive cell or resistor) and with the light meter 2. When the needle 3 is deflected by the scanning surface 8 and causes the contact 20a to move away from the upper contact 20c and to engage the lower contact 20b, the circuit of the photosensitive receiver 23 can be completed without necessitating the flow of current through the resistor 22. When the movable contact 20a engages the contact 20c (as shown in FIG. 1), a second corrective resistor 24 is connected in parallel with the resistor 22 and photosensitive receiver 23. The purpose of the resistors 22 and 24 is to take into account the characteristic curve of the receiver 23.

The receiver 23 is connected with one terminal of the light meter 2. The other terminal of the light meter is connected with the movable contact 25a of a second two-way switch 25; this movable contact is flanked by two additional contacts 25b, 25c. The contact 25b is connected with the other pole of the energy source 21 and the contact 25c is connected with one plate of a capacitor 26 the other plate of which is connected with the other pole of the energy source.

The movable contact 25a has a projection or stud 27 which constitutes a follower and can be engaged and displaced by a cam 28 provided on the camera release 14.

Figure 2:
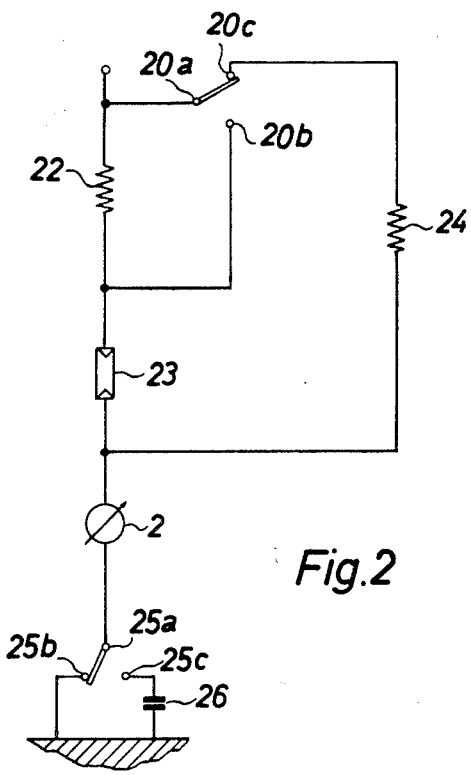
FIG. 2 is a diagram of an electric circuit in the camera of FIG. 1.

FIG. 2 shows the electric circuit of the camera which is illustrated in FIG. 1. The circuit is shown in a condition it assumes when the brightness of scene light has an average value, i.e., when the needle 3 is in the path of movement of the scanning surface 7. The movable contact 20a of the switch 20 engages the fixed contact 20c and the contact 25a of the switch 25 engages the contact 25b. The characteristic curve of the receiver 23 is flat because it is in circuit with the resistors 22, 24.

Figure 3:
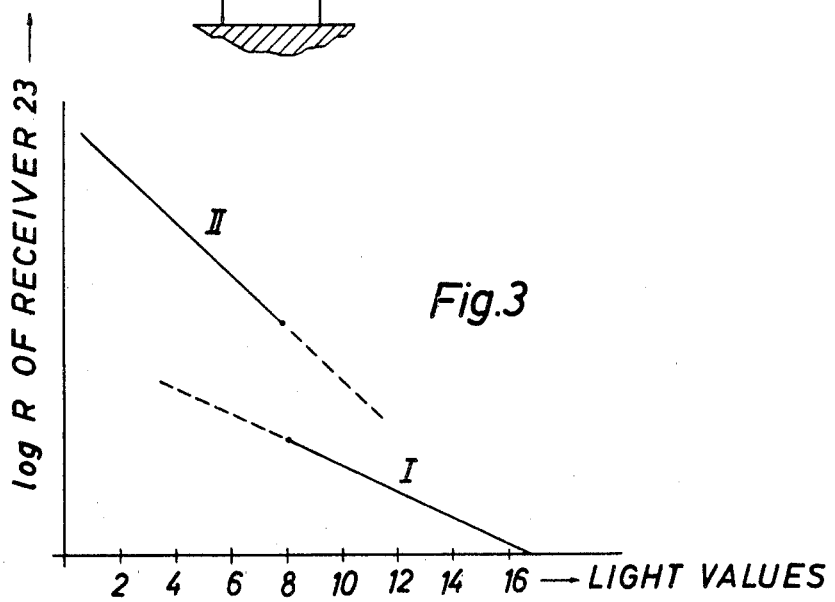
FIG. 3 is a graph explaining the operation of the circuit shown in FIG. 2.

FIG. 3 shows the characteristic curves of the receiver 23. The light degrees are measured along the abscissa and the logarithmic values of ohmic resistance of the receiver 23 are measured along the ordinate. The curve I indicates changes in the resistance of the receiver 23 when the latter is in circuit with the resistors 22, 24, and the curve II indicates the resistance of the receiver 23 when the resistors 22,24 are disconnected, namely, when the needly 3 causes the contact 20a to move away from the contact 20c. The inclination of curve I is less pronounced; this is indicative of that range of light intensities (above the light value 8) at which the exposure time and the aperture size change in response to a change in scene brightness. The curve II is steeper because, when the light intensity is less than eight, the aperture size remains unchanged but the exposure time changes at a different rate as a function of scene brightness. For example, the f/ stop equals 5.6 when the needle 3 in engaged by the scanning surface 8 and is deflected by such surface to move the contact 20a against the contact 20b. In other words, the aperture size is greater than when the needle 3 is pressed against the back support 19 by the leftmost portion of the scanning surface 7. Since the photosensitive receiver 23 is then disconnected from the resistors 22 and 24, its sensitivity is greater and this is indicated by the gap between the curves I and II along a vertical line representing the light value eight. Otherwise stated, the exposure time for the f/stop 5.6 which is selected by the surface 8 is longer than the exposure time for the f/stop 5.6 which is selected by the surface 7. If the intensity of scene light decreases further, namely, below the light value eight, the resistance of the receiver 23 increases at a higher rate than within the range of average scene brightnesses (above the light value eight). This will be readily understood since the aperture size (f/stop 5.6) is then constant and the decreasing intensity of scene light merely causes the exposure control to select a longer exposure time. Thus, a reduction in scene brightness cannot be compensated for by simultaneous changes in aperture size and exposure time; therefore, the difference between exposure times when the light value decreases from, for example, eight to six is greater than when the light value decreases from 14 to 12. Such "resetting" of the exposure time determining circuit 28' is due to the fact that the corrective resistors 22,24 are disconnected from the receiver 23 when the needle 3 over lies the movable contact 20a.

The operation:

The photosensitive receiver 23 is exposed to scene light. In order to make an exposure, the user of the camera depresses the knob 14a so as to move the camera release 14 in the direction indicated by arrow C. The spring 11 is thereby free to contract and moves the detector 6 downwardly (arrow A) until the scanning surfaces 7 or 8 engages the needle 3 and prevents further downward movement of the detector when the needle is caused to engage the back support 19 or when the movable contact 20a comes into engagement with the fixedly mounted rigid contact 20b of the two-way switch 20. It will be seen that, in addition to serving as a means for conducting current the contact 20b also performs the function of a second back support for the needle 3. If the scene brightness which is detected by the receiver 23 is such that the needle 3 overlies the back support 19, the needle is engaged by the stepped scanning surface 7 and is deflected toward and into abutment with the back support 19. Thus, the movable contact 20a then remains in its normal position in which it engages the contact 20c but is disengaged from the contact 20b. Consequently, the resistors 22, 24 remain connected in the electric circuit of the exposure control. The detector 6 automatically selects the size of the diaphragm aperture (not shown) as a function of scene brightness in a manner which is well known from the art of automatic exposure controls for cameras. Adjustment of the aperture size is completed when the movement of the detector 6 in the direction indicated by arrow A is terminated, i.e., when the needle 3 abuts against the back support 19. The circuit is completed because the contact 25a of the second two-way switch 25 engages the contact 25b, i.e., the current flows between the two poles of the energy source 21 by way of the contacts 25b, 25a, light meter 2, resistor 24, and contacts 20

20a as well as through the resistor 22 and receiver 23.

As the user continues to press the knob 14a, the cam 28 engages the follower 27 and moves the contact 25a away from contact 25b so that the contact 25a engages the contact 25c. The entire circuit of the exposure control is then in series with the capacitor 26. This circuit then forms with the capacitor 26 and R-C link which serves to energize the exposure time determining circuit 28'. The circuit 28' controls the shutter (not shown) in a well-known manner so that the exposure time is properly related to the aperture size when the scene brightness is one of the range of average scene brightnesses, namely, when the needle 3 overlies the back support 19. The camera release 14 preferably releases the shutter when the knob 14 a is depressed to its lower end position. The shutter is thereupon closed with a delay determined by the circuit 28' as a function of the resistance of receiver 23.

If the scene brightness is so low that the needle 3 registers with the movable contact 20a, depression of the knob 14a in the direction indicated by arrow C enables the spring 11 to move the scanning surface 8 against the tip of the needle 3 and to move the latter toward engagement with the movable contact 20a whereby the contact 20a leaves the contact 20c and engages the fixedly mounted rigid contact or back support 20b. The detector 6 causes the diaphragm to define an aperture of average size (e.g., 5.6 as described in connection with FIG. 3) which is best suited for making exposures in light whose intensity is less than average. The exposure control then selects the exposure time as a function of scene brightness in the following way: Engagement of the movable contact 20a with the fixedly mounted rigid contact 20b results in disconnection of both resistors 22,24 so that the circuit of the exposure control is completed from one pole of the energy source 21, through the receiver 23, contacts 20a, 20b, light meter 2, and contacts 25a, 25b. As the knob 14a continues to move in the direction indicated by arrow C, the cam 28 causes the contact 25a to engage the contact 25c whereby the capacitor 26 and the circuit including the light meter 2 and receiver 23 constitute an R-C link which causes the circuit 28' to select an exposure time which is a function of scene brightness having a value of eight or less (see FIG. 3).

An important advantage of the just-described exposure control is that the exposure time can be selected automatically as a function of scene brightness not only when the intensity of scene light is rather high but also when such intensity is below average. Another advantage of the exposure control is that the camera can take pictures with highly satisfactory depth of field (because the diaphragm defines an aperture of average size) when the intensity of scene light is below average. Also, the quality of optical reproduction of images at an intensity which is below average is surprisingly satisfactory.

A suitable exposure-time-determining circuit which can be utilized in the camera of FIG. 1 is disclosed, for example, in the copending application Ser. No. 522,283 of Kallen which is assigned to the same assignee. The time constant of the R-C link during charging of the capacitor 26 determines the exposure time. It does not matter that the charging current for the capacitor 26 flows through the light meter 2 because, during charging of the capacitor, the needle 3 is clamped against the back support 19 or against the contact 20a. This will be readily understood since the cam 28 causes the contact 25a to engage the contact 25c subsequent to clamping of the needle 3 against the back support 19 or against the contact 20a (which then engages the fixedly mounted rigid contact 20b). The circuit 28' preferably comprises an electromagnet (not shown) which changes its condition of energization when the capacitor 26 is fully charged and thereby effects closing of the shutter.

Figure 4:
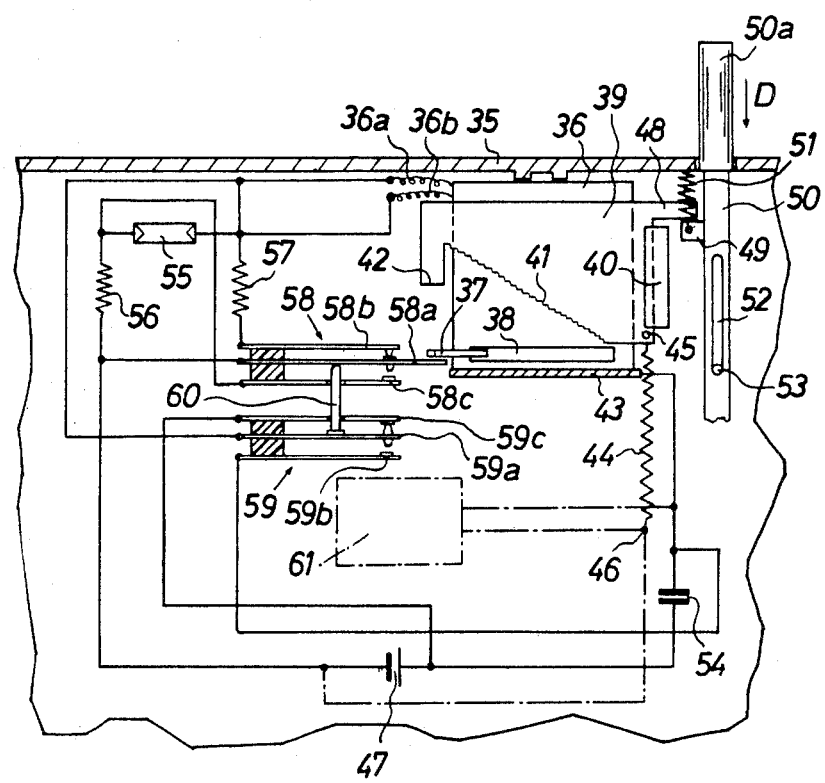
FIG. 4 is a fragmentary sectional view of a second still camera wherein the exposure-time-setting means is actuated by the output member of the light meter.

FIG. 4 illustrates a portion of a second still camera. The main difference between this camera and the camera of FIG. 1 is that the capacitor 54 is connected in circuit only when the intensity of scene light is below average. The second camera comprises a housing or body 35 which accommodates a light meter 36 having an output member or needle 37 movable in a slot 38 of the light meter casing. The detector 39 has a stepped scanning surface 41 and a smooth scanning surface 42 and is reciprocable with reference to a guide means 40 which is fixedly mounted in the housing 35. The scanning surface 41 can deflect the needle 37 against a fixed back support 43 which is installed in the housing 35. The scanning surface 42 can deflect the needle 37 against the movable contact 58a of a first two-way switch 58. A spring 44 which is connected to a post 45 on the detector 39 and to a post 46 in the housing 35 tends to move the detector downwardly, as viewed in FIG. 4, and to thereby maintain a projection or arm 48 of the detector in abutment with a stop 49 on the reciprocable camera release 50. The latter comprises a knob 50a and is formed with an elongated slot 52 for a pin 53 which is fixedly mounted in the housing 35. A strong return spring 51 biases the camera release 50 to the illustrated starting position. The parts 44, 45, 46 constitute a conductor for electric current; the post 46 is electrically connected with one pole of an energy source 47.

One plate of the aforementioned capacitor 54 is electrically connected with the back support 43 which latter forms part of a variable resistor whose slider is the needle 37. The other plate of the capacitor 54 is connected with one pole of the energy source 47. The exposure control of FIG. 2 further comprises a photosensitive receiver 55, two resistors 56,57 (which correspond to the resistors 22,24 of FIG. 1) and a second two-way switch 59 having a movable contact 59a flanked by contacts 59b and 59c. The movable contact 58a is longer than the contacts 58b, 58c of the first two-way switch 58. A motion-transmitting stud 60 causes the contact 59a to engage the contact 59b when the scanning surface 42 causes the needle 37 to move the contact 58a into engagement with the contact 58c. The circuit which selects the exposure time by effecting an appropriate adjustment of the shutter is shown at 61. The numerals 36a, 36b denote the two terminals of the light meter 36. The contact 59a is connected with the terminal 36a and the terminal 36b is connected with one pole of the energy source 47 by way of the contact 59c when the motion transmitting stud 60 assumes the position shown in FIG. 4.

To make an exposure, the user presses the knob 50a in the direction indicated by arrow D. The spring 44 is then free to pull the detector 39 downwardly until the scanning surface 41 (assuming that the scene light is of average intensity) engages the needle 37 and presses it against the back support 43. A current then flows from one pole of the energy source 47, through the conductor 46, 44,45, detector 39, the variable resistor including the needle 37 and back support 43, and capacitor 54. The back support 43 and the capacitor 54 form an R-C link which causes the circuit 61 to set the exposure time as a function of the aperture size, i.e., as a function of the position of the detector 39 which selects the aperture size and hence as a function of the momentary resistance of the variable resistor 43,37. The contacts 58a, 58b connect the resistors 56,57 into the exposure control circuit and the contacts 59a, 59c connect the exposure control circuit with the energy source 47.

If the intensity of scene light is low, the needle 37 overlies the movable contact 58a of the two-way switch 58. As the user depresses the knob 50a, the scanning surface 42 of the detector 39 presses the needle 37 against the contact 58a and causes the latter to move away from the contact 58b and to engage the contact 58c whereby the motion-transmitting stud 60 moves the contact 59a against the contact 59b. The contact 58c is rigid and serves additionally as back support for the needle 37 and movable contact 58a, i.e., the deflection of needle 37 is terminated when the movable contact 58a engages the rigid contact 58c. The switch 58 then disconnects the resistors 56,57 and the switch 59 connects the capacitor 54 in circuit with the energy source 47. The capacitor 54 and the exposure control circuit form an R-C link which causes the circuit 61 to select an appropriate exposure time. The exposure is made in response to complete depression of the camera release 50.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. In a photographic apparatus, a combination comprising light meter means having an output member movable between first and second ranges of positions which are respectively indicative of higher and lower scene brightnesses; detector means movable into engagement with said output member to thereby select one of a series of aperture sizes when said output member assumes one of said first range of positions and to select a predetermined aperture size when the output member assumes one of said second range of positions, said series of aperture sizes including a maximum and a minimum aperture size and said predetermined size being smaller than said maximum size but larger than said minimum size; adjustable shutter-setting means operative to set the shutter and to thereby select the exposure time as a function of scene brightness; and control means for adjusting said shutter-setting means as a function of said predetermined aperture size when said output member assumes one of said second range of positions so that the exposure time which is set by the shutter is a function of scene brightness and a function of said predetermined aperture size.

2. A combination as defined in claim 1, wherein said control means comprises an R-C link having a capacitor and a resistance including said light meter means and variable resistor means having a movable portion and a second portion, said second portion of said variable resistor means constituting a back support which is contacted by said output member when the latter assumes one of said first range of positions and is engaged by said detector means, said back support and said output member consisting at least in part of current-conducting material and said output member constituting the movable portion of said variable resistor means.

3. A combination as defined in claim 1, wherein said control means comprises an R-C link including said light meter means, corrective resistor means, and disconnecting means for disconnecting said resistor means from said link when said output member assumes one of said second range of positions.

4. A combination as defined in claim 3, wherein said disconnecting means includes a switch which is actuated in response to engagement of said detector means with said output member while the latter assumes one of said second range of positions.

5. A combination as defined in claim 3, wherein said link includes capacitor means and a composite resistance which includes said light meter means, and further comprising switch means for connecting said composite resistance with said capacitor means in each position of said output member 6. A combination as defined in claim 3, wherein said link includes capacitor means and a composite resistance which includes said light meter means, and further comprising switch means for connecting said composite resistance with said capacitor means at least when said output member assumes one of said second range of positions.

7. A combination as defined in claim 1, further comprising an exposure control circuit which includes said light meter means and further includes photosensitive receiver means exposed to scene light, at least one corrective resistor and switch means operative to connect and disconnect said resistor from said circuit.

8. A combination as defined in claim 1, further comprising release means movable from a starting position and switch means responsive to movement of said release means from starting position to thereby actuate said control means.

9. A combination as defined in claim 1, wherein said control means includes said output member.

10. A combination as defined in claim 9, wherein said control means further includes said detector means.

11. A combination as defined in claim 1, further comprising a back support which is engaged by said output member when the latter assumes one of said first range of positions and is engaged by said detector means, said control means including an R-C link having a resistance which includes said back support.